US012547203B1

(12) United States Patent
Lee et al.

(10) Patent No.: US 12,547,203 B1
(45) Date of Patent: Feb. 10, 2026

(54) BUTTON STRUCTURE

(71) Applicant: CHENG UEI PRECISION INDUSTRY CO., LTD., New Taipei (TW)

(72) Inventors: Tsung-Shih Lee, New Taipei (TW); Yi Hsu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 19/006,220

(22) Filed: Dec. 30, 2024

(30) Foreign Application Priority Data

Aug. 9, 2024 (CN) ......................... 202421937951.7

(51) Int. Cl.
*G05G 9/04* (2006.01)
*H01H 25/04* (2006.01)

(52) U.S. Cl.
CPC ............. *G05G 9/04* (2013.01); *H01H 25/041* (2013.01)

(58) Field of Classification Search
CPC ............................... H01H 25/041; G05G 9/04
See application file for complete search history.

(56) References Cited

U.S. PATENT DOCUMENTS

2002/0015021 A1* 2/2002 Numata ............... H01H 25/041 345/156
2004/0173448 A1* 9/2004 Torrents Gavalda ........................ H01H 25/041 200/517
2007/0236463 A1* 10/2007 Villain ................. H01H 25/041 345/169

FOREIGN PATENT DOCUMENTS

CN 1286128 A * 3/2001 ............. A63F 13/24
EP 0581583 A2 * 2/1994 ........... H01H 25/041
JP 59205117 A * 11/1984
JP 2000106065 A * 4/2000

* cited by examiner

*Primary Examiner* — Daniel D Yabut
(74) *Attorney, Agent, or Firm* — Cheng-Ju Chiang

(57) ABSTRACT

A button structure includes a circuit board, an elastic element mounted on the circuit board, a hollow base mounted to a top of the elastic element, a directional pad mounted on the base, a metal sheet connected to an inner surface of the directional pad, and a conductive elastic monomer. The conductive elastic monomer is disposed in the directional pad. The conductive elastic monomer is disposed in a middle of the base. A top end of the conductive elastic monomer is connected to the metal sheet, and a bottom end of the conductive elastic monomer has a connecting end extending downward. The bottom end of the conductive elastic monomer is connected to the elastic element. The connecting end passes through the elastic element and the circuit board. The circuit board is electrically connected to the connecting end.

16 Claims, 5 Drawing Sheets

BUTTON STRUCTURE

CROSS REFERENCE TO RELATED APPLICATIONS

The present application is based on, and claims priority from, China Patent Application No. 202421937951.7, filed Aug. 9, 2024, the disclosure of which is hereby incorporated by reference herein in its entirety.

BACKGROUND OF THE INVENTION

Field of the Invention

The present invention generally relates to a button structure, and more particularly to a button structure which is capable of enhancing a sensing effect.

Description of Related Art

Directional pads in game controllers belong to standard components. Most of the game controllers are all equipped with the directional pads. Each directional pad has four keys with different functions. Each directional pad is used for moving towards different directions which are an upward direction, a downward direction, a leftward direction and a rightward direction.

A conventional touching button mounted to a printed circuit board (PCB) includes a conductive key, a conductive elasticity element, a limiting element, a base and two metal pins. The conductive key is electrically connected to the base through the conductive elasticity element and the limiting element. The metal pins of the conventional touching button are connected to the base, and the metal pins of the conventional touching button contact with the conductive elasticity element. When a downward pressure is exerted on the conductive key, the conductive elasticity element is compressed, so that a distance between the conductive key and the base is shortened.

However, though the above-mentioned conductive elasticity element is acted as a conductor, the above-mentioned conductive elasticity element is limited to a shape of the conductive elasticity element. As a result, a contact area between the conductive key and the conductive elasticity element is limited, and the conventional touching button is less sensitive.

Therefore, it is necessary to provide an innovative button structure which is capable of enhancing a sensing effect.

BRIEF SUMMARY OF THE INVENTION

An object of the present invention is to provide a button structure, comprising: a directional pad; a hollow base mounted in the directional pad; a metal sheet disposed between an upper surface of the base and an inner surface of the directional pad; a spring disposed in a middle of the base, the spring having a contacting end disposed at a top end of the spring, and a connecting end extended downward from a bottom end of the spring, the contacting end of the spring contacting with a bottom surface of the metal sheet; an elastic piece disposed under a lower surface of the base, the connecting end of the spring passing through the elastic piece; and a circuit board disposed under a lower surface of the elastic piece, the connecting end of the spring being fastened to the circuit board, wherein the connecting end of the spring is electrically connected to the circuit board, the circuit board and the spring are mutually conductive, so that the circuit board and the metal sheet are mutually conductive.

Another object of the present invention is to provide a button structure, comprising: a directional pad; a metal sheet connected to an inner surface of the directional pad; a base mounted in the directional pad, the base being mounted under the metal sheet; a conductive elastic element disposed in the directional pad, the conductive elastic element being disposed in the base, a top end of the conductive elastic element being electrically connected to the metal sheet, and a bottom end of the conductive elastic element having a connecting end; a circuit board electrically connected to the connecting end; and an elastic piece mounted between the base together with the conductive elastic element, and the circuit board, the connecting end passing through the elastic piece.

Another object of the present invention is to provide a button structure, comprising: a circuit board; an elastic piece mounted on the circuit board; a hollow base mounted to a top of the elastic piece; a directional pad mounted on the base; a metal sheet connected to an inner surface of the directional pad; and a conductive elastic element disposed in the directional pad, the conductive elastic element being disposed in the base, a top end of the conductive elastic element being electrically connected to the metal sheet, and a bottom end of the conductive elastic element having a connecting end extending downward, the bottom end of the conductive elastic element being connected to the elastic piece, the connecting end passing through the elastic piece and the circuit board, the circuit board being electrically connected to the connecting end.

As described above, a top surface of the metal sheet of the button structure is fastened to bottom surfaces of a first protrusion and a plurality of second protrusions by an ultrasonic fusion way, and the bottom surface of the metal sheet is fastened to upper surfaces of the plurality of the protruding blocks by the ultrasonic fusion way. The connecting end of the spring is electrically connected to the circuit board, so the circuit board and the spring are mutually conductive. The contacting end of the spring contacts with lower surfaces of main bodies of the metal sheet to ensure that the circuit board and the metal sheet are conductive. Therefore, the button structure is capable of enhancing a sensing effect.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
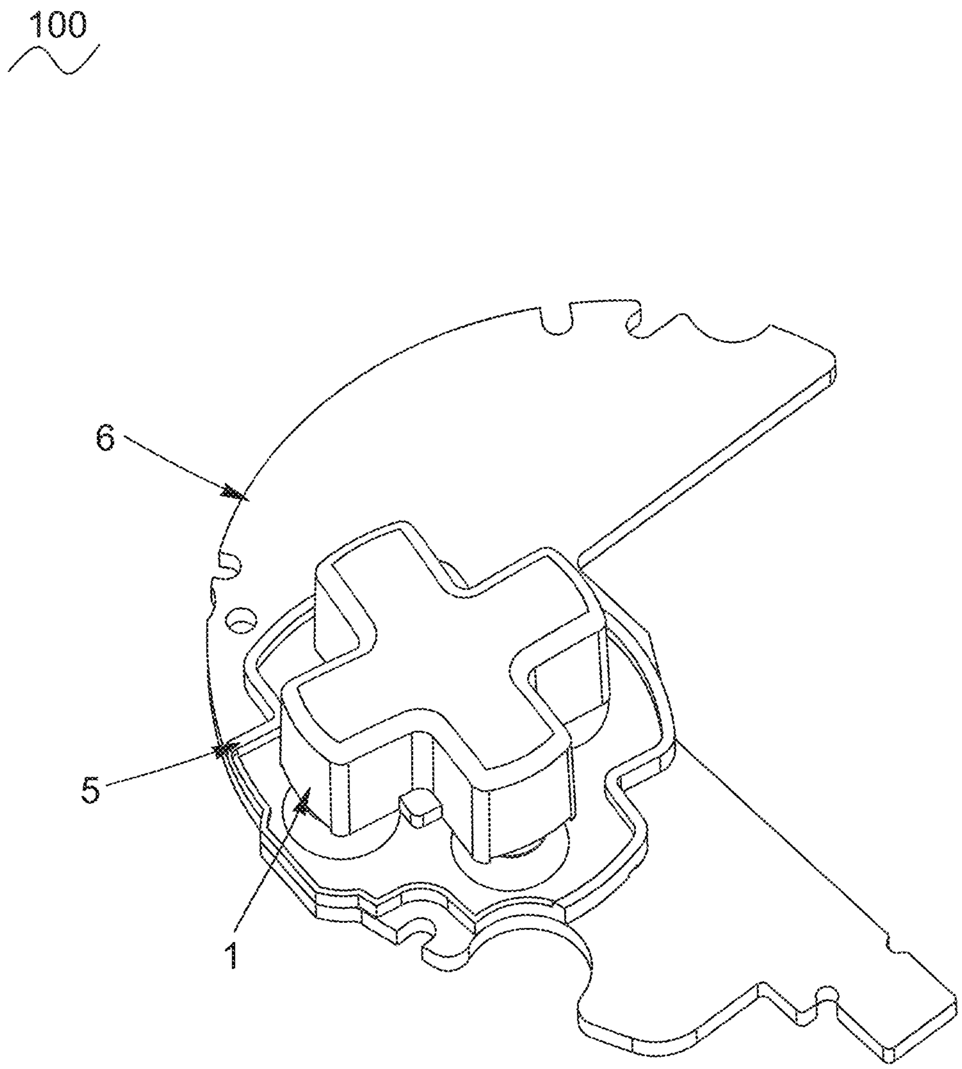
FIG. 1 is a perspective view of a button structure according to a preferred embodiment of the present invention.
Figure 2:
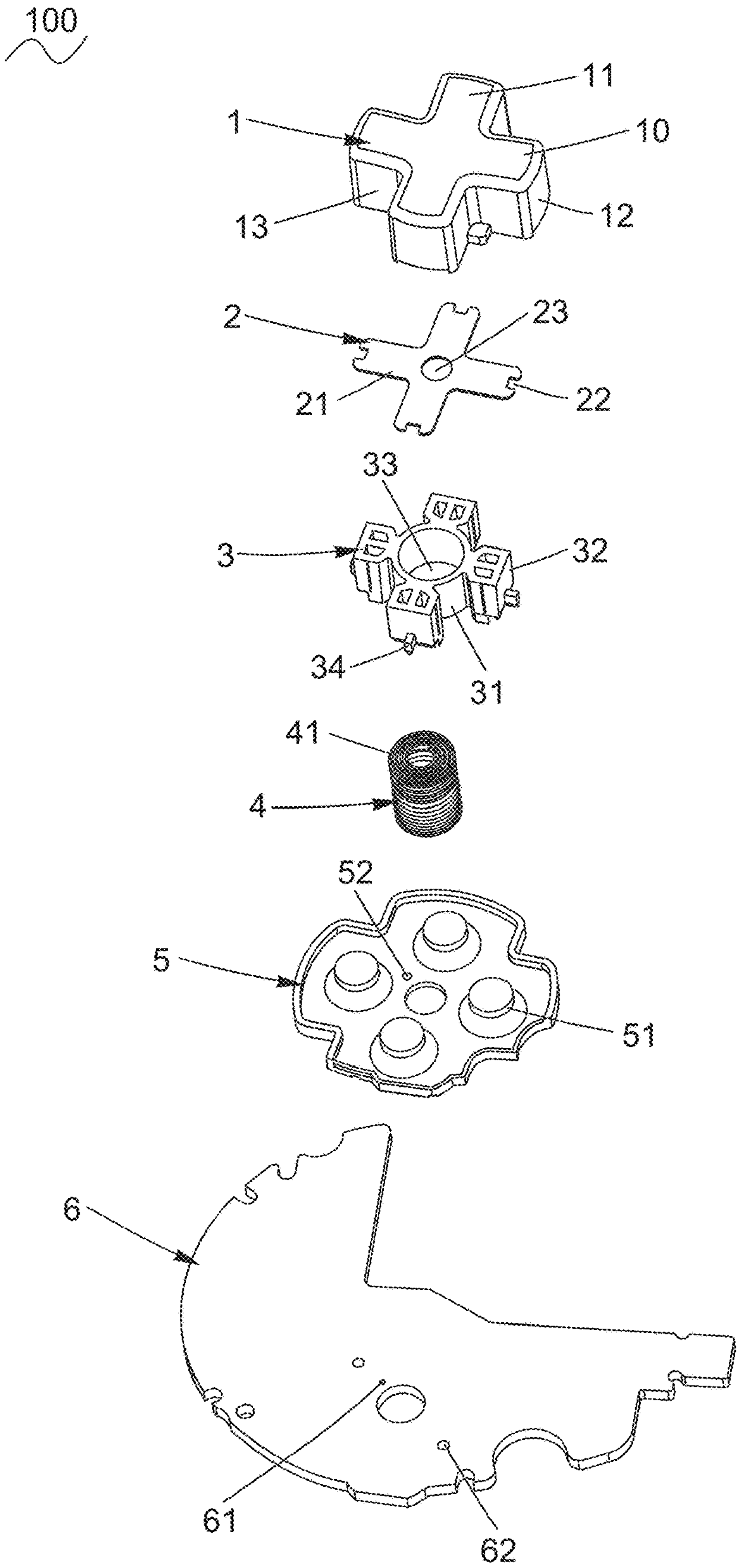
FIG. 2 is an exploded view of the button structure according to the preferred embodiment of the present invention.
Figure 3:
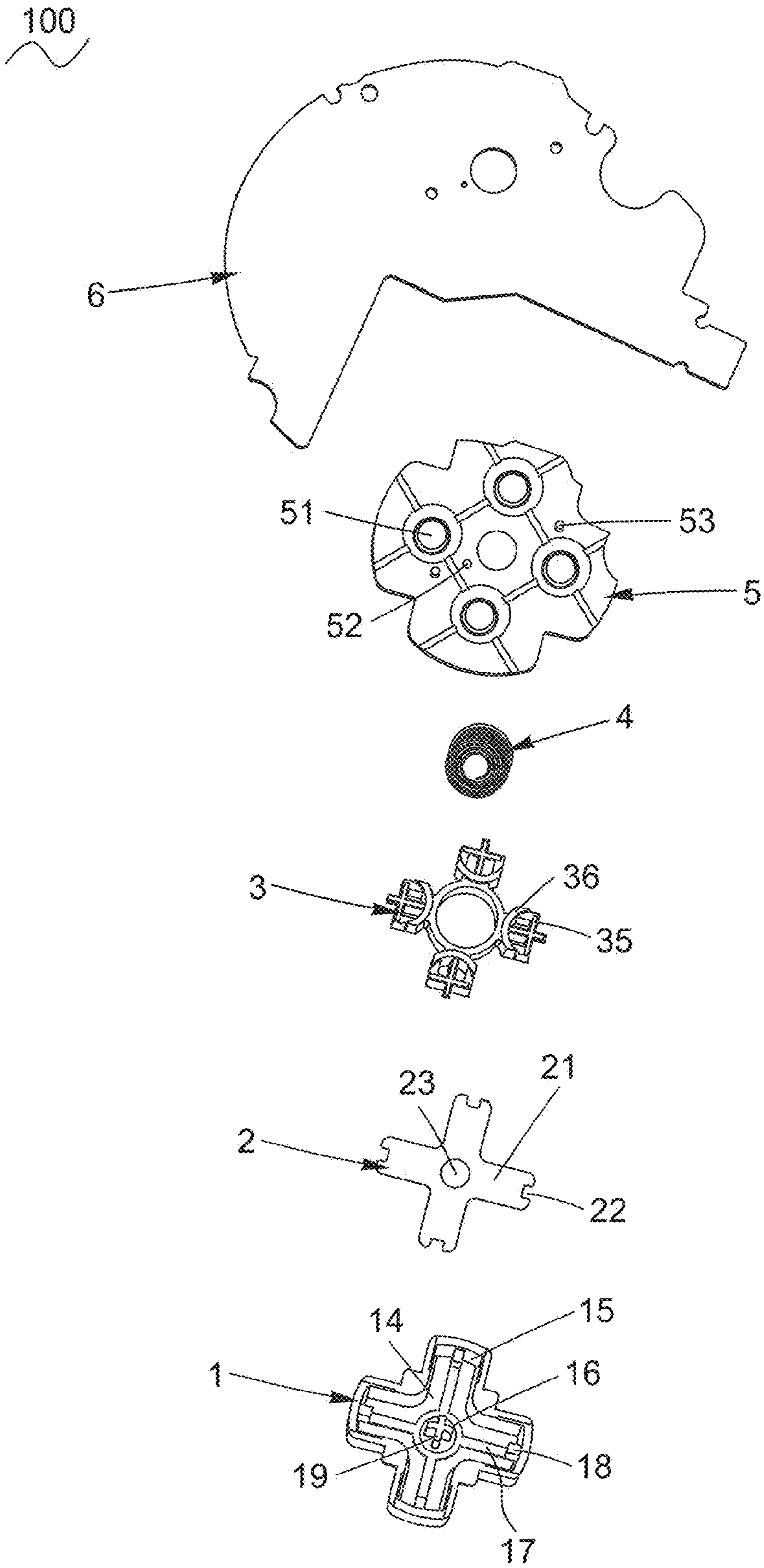
FIG. 3 is another exploded view of the button structure according to the preferred embodiment of the present invention.

Referring to FIG. 1 to FIG. 3, a button structure 100 according to a preferred embodiment of the present invention is shown. The button structure 100 includes a directional pad (D-Pad) 1, a metal sheet 2, a hollow base 3 mounted in the directional pad 1, a conductive elastic element which is a spring 4, an elastic piece 5 and a circuit board 6.

The directional pad 1 encloses the metal sheet 2 and the base 3. The metal sheet 2 is connected to an inner surface of the directional pad 1. The metal sheet 2 is disposed between an upper surface of the base 3 and the inner surface of the directional pad 1. In this preferred embodiment, the metal sheet 2 is fastened between the base 3 and the directional pad 1 by an ultrasonic fusion way. In a concrete implementation, the metal sheet 2 is without being limited to be fastened between the base 3 and the directional pad 1 by the ultrasonic fusion way. The spring 4 is disposed in a middle of the base 3 along an up-down direction. The spring 4 is compressed or released along the up-down direction. A contacting end 41 of the spring 4 contacts with a bottom surface of the metal sheet 2. The elastic element 5 is disposed under a lower surface of the base 3. The elastic element 5 is mounted on the circuit board 6. The circuit board 6 is disposed under a lower surface of the elastic element 5. In the concrete implementation, the directional pad 1 which is the cross shape is able to be changed to other keys with different shapes, such as a circular key or a square key. A shape of the metal sheet 2 is able to be altered according to an inner wall shape of the directional pad 1 of the button structure 100 to enhance a sensing effect of the button structure 100.

With reference to FIG. 2 to FIG. 5, the directional pad 1 has four pressing areas 10 in four directions of the directional pad 1. The directional pad 1 is shown as a cross shape. The directional pad 1 has a top wall 11, a plurality of side walls 12, a plurality of connecting walls 13, an upper inner surface 14, a plurality of side inner surfaces 15, a first protrusion 16, a plurality of second protrusions 17, a plurality of bumps 18 and a protruding column 19. The top wall 11 of the directional pad 1 is shown as the cross shape, and the connecting wall 13 of the directional pad 1 is L-shaped. The plurality of the side walls 12 are extended downward from two ends and two sides of the top wall 11 of the directional pad 1. The plurality of the side walls 12 are disposed to the four directions of the directional pad 1. Specifically, the directional pad 1 has four side walls 12. The four side walls 12 are disposed to the four directions of the directional pad 1. Two adjacent edges of each two adjacent side walls 12 extend inward and then are interconnected with each other to form a connecting wall 13 connected to a bottom surface of the top wall 11. The connecting walls 13 of the plurality of the side walls 12 together form the plurality of the connecting walls 13. Each connecting wall 13 is connected between two side walls 12.

In this preferred embodiment, the top wall 11, the plurality of the side walls 12 and the plurality of the connecting walls 13 together define the directional pad 1. Two opposite ends and two opposite sides of the directional pad 1 define the four pressing areas 10. Each pressing area 10 is surrounded by a top end of a part of the top wall 11, a top end of one side wall 12 and top ends of two parts of two connecting walls 13. The bottom surface of the top wall 11 of the directional pad 1 is defined as the upper inner surface 14. An inner side of each side wall 12 of the directional pad 1 has the side inner surface 15. In the concrete implementation, if the directional pad 1 is changed from the cross shape to other shapes, such as a circular shape or a square shape, the directional pad 1 is able to be composed of the top wall 11 and the plurality of the side walls 12, and the plurality of the connecting walls 13 are omitted.

A middle of the upper inner surface 14 of the top wall 11 protrudes downward to form the first protrusion 16. In this preferred embodiment, the first protrusion 16 is formed as a hollow circular shape. Two opposite ends and two opposite sides of an outer periphery wall of the first protrusion 16 extend outward and towards four directions to form the plurality of the second protrusions 17. One ends of the plurality of the second protrusions 17 are connected with the outer periphery wall of the first protrusion 16. The two opposite ends of the outer periphery wall of the first protrusion 16 extend outward and longitudinally to form the two second protrusions 17. The two opposite sides of the outer periphery wall of the first protrusion 16 extend outward and transversely to form the other two second protrusions 17. In this preferred embodiment, each second protrusion 17 is formed as a straight flat plate shape. The directional pad 1 has four second protrusions 17. Four bottoms of the four pressing areas 10 are connected with the four second protrusions 17. A bottom surface of the first protrusion 16 is flush with bottom surfaces of the plurality of the second protrusions 17. In this preferred embodiment, a top surface of the metal sheet 2 is fastened to the bottom surfaces of the first protrusion 16 and the plurality of the second protrusions 17 by the ultrasonic fusion way. In the concrete implementation, the top surface of the metal sheet 2 is without being limited to be fastened to the bottom surfaces of the first protrusion 16 and the plurality of the second protrusions 17.

The side inner surfaces 15 of the plurality of the side walls 12 extend inward to form the plurality of the bumps 18. The plurality of the bumps 18 are connected to the other ends of the plurality of the second protrusions 17. A corresponding mechanism of the metal sheet 2 is buckled with the plurality of the bumps 18 for positioning and fixing the directional pad 1 and the metal sheet 2. The middle of the upper inner surface 14 of the top wall 11 of the directional pad 1 protrudes downward to form the protruding column 19. The protruding column 19 is formed in a middle of the first protrusion 16. The protruding column 19 passes through a corresponding section of the metal sheet 2 for positioning and fixing the directional pad 1 and the metal sheet 2.

The metal sheet 2 has a plurality of main bodies 21, a plurality of notches 22 and a through hole 23. Two opposite sides and two opposite ends of the metal sheet 2 form the plurality of the main bodies 21 in the four directions. In this preferred embodiment, the metal sheet 2 has four main bodies 21. The main bodies 21 of the metal sheet 2 are formed as the cross shape. The upper surfaces of the plurality of the main bodies 21 are fastened to the first protrusion 16 and the plurality of the second protrusions 17 by the ultrasonic fusion way. In the concrete implementation, the upper surfaces of the plurality of the main bodies 21 are without being limited to be fastened to the first protrusion 16 and the plurality of the second protrusions 17 by the ultrasonic fusion way. A middle of an outer edge of each main body 21 is recessed inward to form a notch 22. The notches 22 of the plurality of the main bodies 21 are buckled with the plurality of the bumps 18 of the directional pad 1, so that the metal sheet 2 is located to the directional pad 1, and the metal sheet 2 is fixed to the directional pad 1.

A middle of the metal sheet 2 has the through hole 23 penetrating through the top surface and the bottom surface of the metal sheet 2. The metal sheet 2 has the through hole 23 penetrating through the upper surfaces and lower surfaces of the plurality of the main bodies 21. The protruding column 19 of the directional pad 1 passes through the through hole 23, so that the metal sheet 2 is located to the directional pad 1, and the metal sheet 2 is fixed to the directional pad 1. In the concrete implementation, if the directional pad 1 is changed from the cross shape to other shapes, such as the circular shape or the square shape, the shape of the metal sheet 2 is able to be changed according to the inner wall shape of the directional pad 1 of the button structure 100, so the metal sheet 2 is able to have only one main body 21, and a shape of each main body 21 is able to be changed according to the shape of the inner wall shape of the directional pad 1.

The directional pad 1 is mounted on the base 3. The base 3 is mounted to a top of the elastic piece 5. The base 3 is mounted under the metal sheet 2. The base 3 has a pedestal 31, a plurality of protruding blocks 32, an assembling hole 33, a plurality of positioning blocks 34, a plurality of pressing portions 35 and a plurality of retaining walls 36. The pedestal 31 is shown as a hollow cylinder shape. Two opposite ends and two opposite sides of the pedestal 31 extend outward to form the plurality of the protruding blocks 32 in the four directions. The plurality of the protruding blocks 32 are positioned corresponding to the plurality of the main bodies 21 of the metal sheet 2. The bottom surface of the metal sheet 2 is fastened to upper surfaces of the plurality of the protruding blocks 32 by the ultrasonic fusion way. The lower surfaces of the plurality of the main bodies 21 of the metal sheet 2 are fastened to the upper surfaces of the plurality of the protruding blocks 32 by the ultrasonic fusion way. In the concrete implementation, the lower surfaces of the plurality of the main bodies 21 of the metal sheet 2 are without being limited to be fastened to the upper surfaces of the plurality of the protruding blocks 32 by the ultrasonic fusion way.

The base 3 has the assembling hole 33 penetrating through an upper surface and a lower surface of the pedestal 31. The spring 4 is disposed in the assembling hole 33, and the through hole 23 of the metal sheet 2 is positioned corresponding to the assembling hole 33. The protruding column 19 of the directional pad 1 passes through the through hole 23 of the metal sheet 2 and the assembling hole 33 of the base 3. Lower portions of outer surfaces of the plurality of the protruding blocks 32 protrude outward to form the plurality of the positioning blocks 34. Top surfaces of the plurality of the positioning blocks 34 abut against bottom surfaces of the plurality of the bumps 18 of the directional pad 1, so that the base 3 is located to the directional pad 1, and the base 3 is fixed to the directional pad 1.

Lower surfaces of the plurality of the protruding blocks 32 and the plurality of the positioning blocks 34 protrude downward to form the plurality of the pressing portions 35. In this preferred embodiment, each pressing portion 35 is cross-shaped. In the concrete implementation, each pressing portion 35 is without being limited to be cross-shaped. The plurality of the pressing portions 35 are configured to press downward on corresponding zones of the elastic piece 5 to trigger directional signals so as to execute orientation movements. The lower surfaces of the plurality of the protruding blocks 32 protrude downward and are arched inward to form the plurality of the retaining walls 36. Each retaining wall 36 is shown as an arc shape. The plurality of the retaining walls 36 are disposed to inner sides of the plurality of the pressing portions 35. In this preferred embodiment, the spring 4 is closer to the plurality of the retaining walls 36 than to the plurality of the pressing portions 35. The plurality of the retaining walls 36 are used to guide the base 3 to be accurately assembled to the top of the elastic piece 5. In the concrete implementation, if the directional pad 1 is changed from the cross shape to other shapes such as the circular shape or the square shape, the shape of the base 3 is also able to be changed according to the inner wall shape of the directional pad 1 of the button structure 100.

The conductive elastic element is disposed in the directional pad 1. The conductive elastic element is disposed in the middle of the base 3. A top end of the conductive elastic element is connected to the metal sheet 2, and a bottom end of the conductive elastic element has a connecting end 42 extending downward. The bottom end of the conductive elastic element is connected to the elastic piece 5. The connecting end 42 passes through the elastic piece 5 and the circuit board 6. The circuit board 6 is electrically connected to the connecting end 42.

The spring 4 has the contacting end 41 disposed at a top end of the spring 4, and the connecting end 42 extended downward from a bottom end of the spring 4. The connecting end 42 of the spring 4 is fastened to the circuit board 6. The connecting end 42 of the spring 4 is electrically connected to the circuit board 6. The contacting end 41 contacts with inner ends of lower surfaces of the main bodies 21 of the metal sheet 2 for making that the circuit board 6 and the metal sheet 2 are mutually conductive, so that the sensing effect of the button structure 100 is enhanced. The spring 4 surrounds an outside of the protruding column 19, and the spring 4 is disposed in the assembling hole 33 of the base 3. In the concrete implementation, the spring 4 is able to be replaced by other conductive elastic components, such as a conductive sleeve which is made of a metal plate or a conductive plastic material.

The elastic piece 5 is mounted between the base 3 together with the conductive elastic element, and the circuit board 6. The connecting end 42 passes through the elastic piece 5. The elastic piece 5 has a plurality of pressing columns 51, a first perforation 52 and at least one positioning column 53. In this preferred embodiment, the elastic piece 5 has two positioning columns 53. Several portions of an upper surface of the elastic piece 5 protrude upward to form the plurality of the pressing columns 51. The plurality of the pressing columns 51 are positioned corresponding to the plurality of the pressing portions 35 of the base 3. The plurality of the pressing portions 35 of the base 3 press downward on the plurality of the pressing columns 51 to trigger the directional signals to execute the orientation movements. The plurality of the retaining walls 36 are disposed on one sides of the plurality of the pressing columns 51, and the plurality of the retaining walls 36 ensure that the plurality of the pressing portions 35 are corresponding to the plurality of the pressing columns 51. The spring 4 is disposed among the plurality of the pressing columns 51.

The elastic piece 5 has the first perforation 52 penetrating through an upper surface and the lower surface of the elastic piece 5. In this preferred embodiment, the first perforation 52 is formed among the plurality of the pressing columns 51. The connecting end 42 of the spring 4 passes through the first perforation 52 of the elastic piece 5. Two portions of the lower surface of the elastic piece 5 extend downward to form the two positioning columns 53. The two positioning columns 53 are disposed in corresponding mechanisms of the circuit board 6, so that the elastic piece 5 is located to the circuit board 6, and the elastic piece 5 is fixed to the circuit board 6. In the concrete implementation, if the directional pad 1 is changed from the cross shape to other shapes, such as the circular shape or the square shape. The upper surface of the elastic piece 5 is able to be provided with only one pressing column 51.

Figure 4:
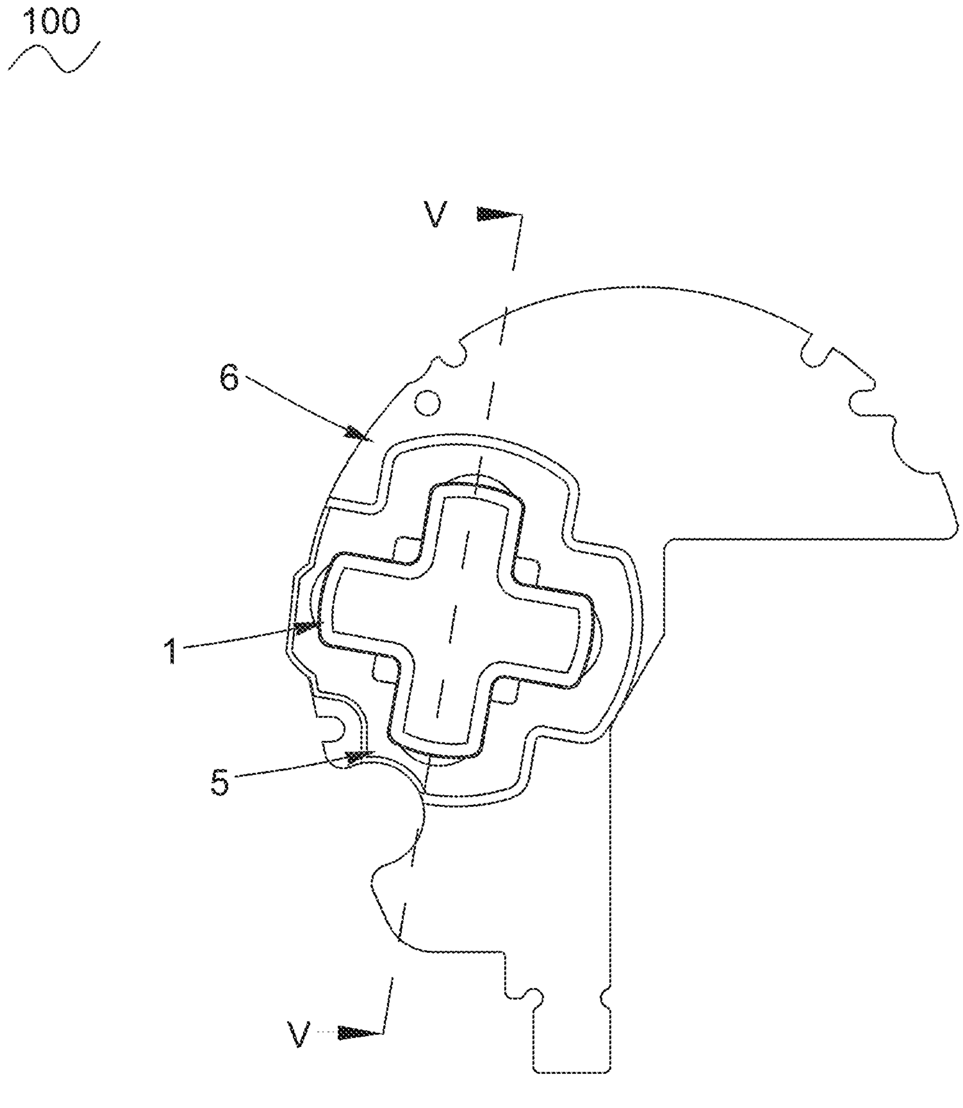
FIG. 4 is a schematic view of the button structure according to the preferred embodiment of the present invention.
Figure 5:
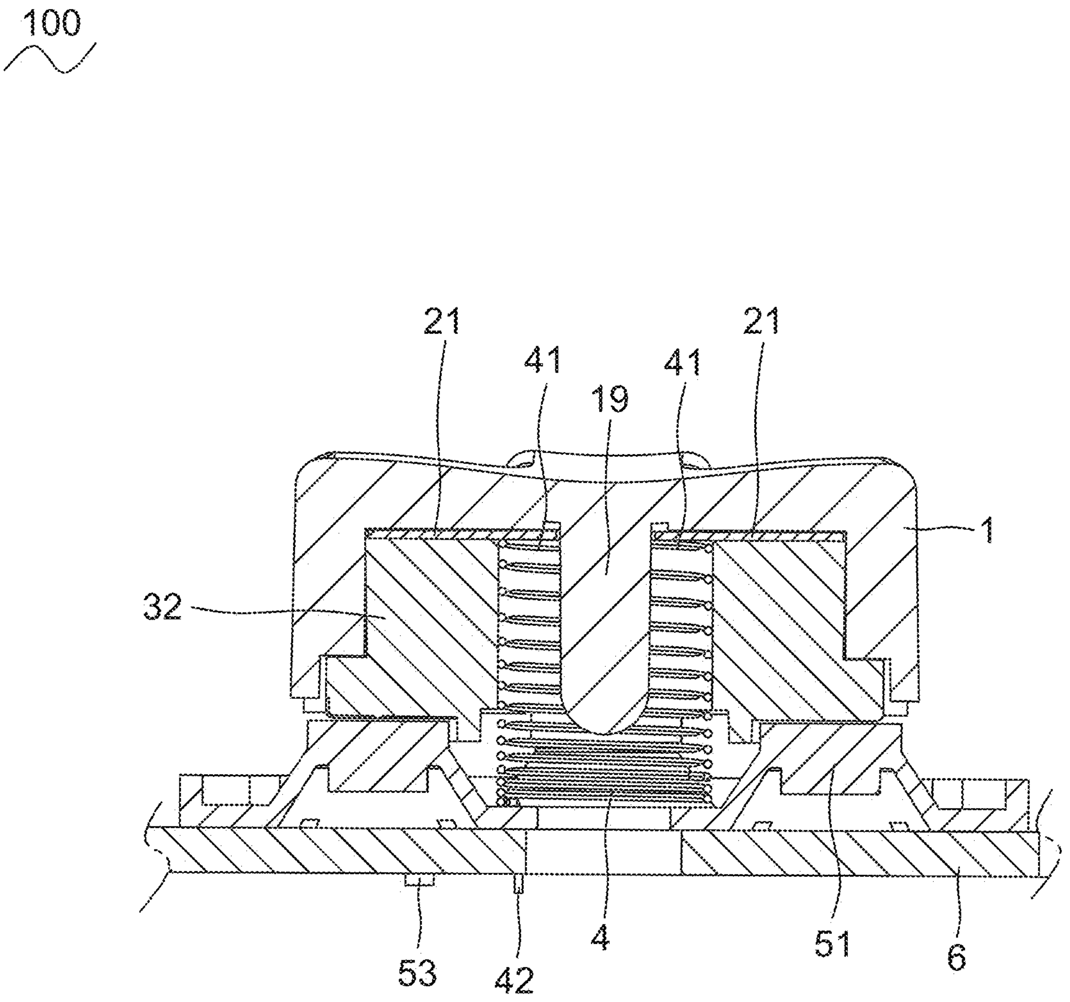
FIG. 5 is a cross-sectional view of the button structure along a line V-V of FIG. 4.

Referring to FIG. 2 to FIG. 5 again, the circuit board 6 has a second perforation 61 and at least one positioning hole 62. In this preferred embodiment, the circuit board 6 has two positioning holes 62. The circuit board 6 has the second perforation 61 penetrating through an upper surface and a lower surface of the circuit board 6. The second perforation 61 is arranged corresponding to the first perforation 52 of the elastic element 5. The connecting end 42 passes through the first perforation 52 and the second perforation 61 to be electrically connected to a contacting point (not shown) of the circuit board 6, so the circuit board 6 and the spring 4 are mutually conductive. The circuit board 6 has the two positioning holes 62 penetrating through the upper surface and the lower surface of the circuit board 6. The second perforation 61 is located between the two positioning holes 62. The two positioning columns 53 of the elastic piece 5 are disposed in the two positioning holes 62, so that the elastic piece 5 is located to the circuit board 6, and the elastic piece 5 is fastened to the circuit board 6. The upper surface of the circuit board 6 is electrically connected with the bottom surface of the metal sheet 2 via the spring 4, so that the circuit board 6 and the metal sheet 2 are mutually conductive.

As described above, the top surface of the metal sheet 2 of the button structure 100 is fastened to the bottom surfaces of the first protrusion 16 and the plurality of the second protrusions 17 by the ultrasonic fusion way, and the bottom surface of the metal sheet 2 is fastened to the upper surfaces of the plurality of the protruding blocks 32 by the ultrasonic fusion way. The connecting end 42 of the spring 4 is electrically connected to the circuit board 6, so the circuit board 6 and the spring 4 are mutually conductive. The contacting end 41 of the spring 4 contacts with the lower surfaces of the main bodies 21 of the metal sheet 2 to ensure that the circuit board 6 and the metal sheet 2 are conductive. Therefore, the button structure 100 is capable of enhancing the sensing effect.

What is claimed is:

1. A button structure, comprising:

a directional pad;

a hollow base mounted in the directional pad;

a metal sheet disposed between an upper surface of the base and an inner surface of the directional pad;

a spring disposed in a middle of the base, the spring having a contacting end disposed at a top end of the spring, and a connecting end extended downward from a bottom end of the spring, the contacting end of the spring contacting with a bottom surface of the metal sheet;

an elastic piece disposed under a lower surface of the base, the connecting end of the spring passing through the elastic piece; and a circuit board disposed under a lower surface of the elastic piece, the connecting end of the spring being fastened to the circuit board;

wherein the connecting end of the spring is electrically connected to the circuit board, the circuit board and the spring are mutually conductive, so that the circuit board and the metal sheet are mutually conductive.

2. The button structure as claimed in claim 1, wherein the directional pad has a top wall, a plurality of side walls extended downward from the top wall, and a plurality of connecting walls, two adjacent edges of each two adjacent side walls extend inward and then are interconnected with each other to form a connecting wall connected to a bottom surface of the top wall, the connecting walls of the plurality of the side walls together form the plurality of the connecting walls, the top wall, the plurality of the side walls and the plurality of the connecting walls together define the directional pad.

3. The button structure as claimed in claim 2, wherein the top wall of the directional pad is shown as a cross shape, and the connecting wall of the directional pad is L-shaped.

4. The button structure as claimed in claim 2, wherein an inner side of each side wall of the directional pad has a side inner surface, the side inner surfaces of the plurality of the side walls extend inward to form a plurality of bumps, two opposite sides and two opposite ends of the metal sheet form a plurality of main bodies in four directions, a middle of an outer edge of each main body is recessed inward to form a notch, the notches of the plurality of the main bodies are buckled with the plurality of the bumps.

5. The button structure as claimed in claim 4, wherein the metal sheet has four main bodies, the main bodies of the metal sheet are formed as a cross shape.

6. The button structure as claimed in claim 4, wherein the bottom surface of the top wall of the directional pad is defined as an upper inner surface, a middle of the upper inner surface protrudes downward to form a first protrusion, two opposite ends and two opposite sides of an outer periphery wall of the first protrusion extend outward and towards the four directions to form a plurality of second protrusions, one ends of the plurality of the second protrusions are connected with the outer periphery wall of the first protrusion, the plurality of the bumps are connected to the other ends of the plurality of the second protrusions, a bottom surface of the first protrusion is flush with bottom surfaces of the plurality of the second protrusions, a top surface of the metal sheet is fastened to the bottom surfaces of the first protrusion and the plurality of the second protrusions.

7. The button structure as claimed in claim 6, wherein each second protrusion is formed as a straight flat plate shape.

8. The button structure as claimed in claim 6, wherein the directional pad has four pressing areas in the four directions, the directional pad has four second protrusions, four bottoms of the four pressing areas are connected with the four second protrusions.

9. The button structure as claimed in claim 6, wherein the first protrusion is formed as a hollow circular shape, the middle of the upper inner surface of the top wall of the directional pad protrudes downward to form a protruding column, the protruding column is formed in a middle of the first protrusion, the metal sheet has a through hole penetrating through upper surfaces and lower surfaces of the plurality of the main bodies, the base has a pedestal, the base has an assembling hole penetrating through an upper surface and a lower surface of the pedestal, the spring is disposed in the assembling hole, and the through hole is positioned corresponding to the assembling hole, the protruding column passes through the through hole and the assembling hole.

10. The button structure as claimed in claim 4, wherein the base has a pedestal, two opposite ends and two opposite sides of the pedestal extend outward to form a plurality of protruding blocks in the four directions, the plurality of the protruding blocks are positioned corresponding to the plurality of the main bodies, lower surfaces of the plurality of the main bodies of the metal sheet are fastened to upper surfaces of the plurality of the protruding blocks, lower portions of outer surfaces of the plurality of the protruding blocks protrude outward to form a plurality of positioning blocks, top surfaces of the plurality of the positioning blocks abut against bottom surfaces of the plurality of the bumps.

11. The button structure as claimed in claim 10, wherein lower surfaces of the plurality of the protruding blocks and the plurality of the positioning blocks protrude downward to form a plurality of pressing portions, the lower surfaces of the plurality of the protruding blocks protrude downward and are arched inward to form a plurality of retaining walls, the plurality of the retaining walls are disposed to inner sides of the plurality of the pressing portions, the spring is closer to the plurality of the retaining walls than to the plurality of the pressing portions.

12. The button structure as claimed in claim 11, wherein each retaining wall is shown as an arc shape.

13. The button structure as claimed in claim 11, wherein several portions of an upper surface of the elastic piece protrude upward to form a plurality of pressing columns, the plurality of the pressing columns are positioned corresponding to the plurality of the pressing portions of the base, the plurality of the retaining walls are disposed on one sides of the plurality of the pressing columns, the spring is disposed among the plurality of the pressing columns.

14. A button structure, comprising:

a directional pad;

a metal sheet connected to an inner surface of the directional pad;

a base mounted in the directional pad, the base being mounted under the metal sheet;

a conductive elastic element disposed in the directional pad, the conductive elastic element being disposed in the base, a top end of the conductive elastic element being electrically connected to the metal sheet, and a bottom end of the conductive elastic element having a connecting end;

a circuit board electrically connected to the connecting end; and an elastic piece mounted between the base together with the conductive elastic element, and the circuit board, the connecting end passing through the elastic piece.

15. A button structure, comprising:

a circuit board;

an elastic piece mounted on the circuit board;

a hollow base mounted to a top of the elastic piece;

a directional pad mounted on the base;

a metal sheet connected to an inner surface of the directional pad; and a conductive elastic element disposed in the directional pad, the conductive elastic element being disposed in the base, a top end of the conductive elastic element being electrically connected to the metal sheet, and a bottom end of the conductive elastic element having a connecting end extending downward, the bottom end of the conductive elastic element being connected to the elastic piece, the connecting end passing through the elastic piece and the circuit board, the circuit board being electrically connected to the connecting end.

16. The button structure as claimed in claim 15, wherein the elastic piece has a first perforation penetrating through an upper surface and a lower surface of the elastic piece, the circuit board has a second perforation penetrating through an upper surface and a lower surface of the circuit board, the second perforation is arranged corresponding to the first perforation, the connecting end passes through the first perforation and the second perforation.

* * * * *